(12) United States Patent
Kuromizu (10) Patent No.: US 9,817,177 B2
(45) Date of Patent: Nov. 14, 2017

(54) LIGHT SOURCE DEVICE AND DISPLAY APPARATUS

(71) Applicant: Sakai Display Products Corporation, Sakai-shi, Osaka (JP)

(72) Inventor: Yasumori Kuromizu, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/780,754

(22) PCT Filed: May 23, 2014

(86) PCT No.: PCT/JP2014/063728
§ 371 (c)(1),
(2) Date: Sep. 28, 2015

(87) PCT Pub. No.: WO2014/192660
PCT Pub. Date: Dec. 4, 2014

(65) Prior Publication Data
US 2016/0085020 A1    Mar. 24, 2016

(30) Foreign Application Priority Data
May 28, 2013  (JP) .................................. 2013-112246

(51) Int. Cl.
*G02B 6/00*     (2006.01)
*F21V 8/00*     (2006.01)
*G02F 1/1333*   (2006.01)

(52) U.S. Cl.
CPC ......... *G02B 6/0061* (2013.01); *G02B 6/0045* (2013.01); *G02B 6/0088* (2013.01); *G02B 6/0055* (2013.01); *G02F 2001/133322* (2013.01)

(58) Field of Classification Search
CPC .................................................. G02B 6/0061
(Continued)

(56) References Cited

U.S. PATENT DOCUMENTS 6,690,702 B1 * 2/2004 Ohmi ...................... H01S 3/225
372/35
8,282,262 B2  10/2012 Matsui
(Continued)

FOREIGN PATENT DOCUMENTS

JP     H09-185056 A    7/1997
JP     H11-053920 A    2/1999
(Continued)

OTHER PUBLICATIONS

Office Action for U.S. Appl. No. 14/400,762 dated Apr. 18, 2016, 13 pages.

*Primary Examiner* — Andrew Coughlin
*Assistant Examiner* — Keith Delahoussaye
(74) *Attorney, Agent, or Firm* — Rudy J. Ng; Bret E. Field; Bozicevic, Field & Francis LLP (57) ABSTRACT

Provided are a light source device capable of suppressing reflection of light which is irregularly reflected on a side face relating to a notch part, and a display apparatus. The light source device includes a light guide plate having a notch part formed at an edge part thereof, and a reflection sheet which is disposed to face the light guide plate and has a notch part formed at an edge part corresponding to the notch part, wherein the reflection sheet includes a low-reflection part which is provided around the notch part of a surface facing the light guide plate and has a reflectance lower than that of the reflection sheet.

12 Claims, 9 Drawing Sheets

(58) Field of Classification Search
USPC .................................................. 362/61, 215
See application file for complete search history.

(56) References Cited

U.S. PATENT DOCUMENTS

| | | |
|---|---|---|
| 8,421,947 B2 | 4/2013 | Cho et al. |
| 8,456,592 B2 | 6/2013 | Go et al. |
| 8,934,070 B2 | 1/2015 | Jung et al. |
| 9,013,652 B2 | 4/2015 | Tomomasa |
| 2009/0231513 A1* | 9/2009 | Ohta ................ G02B 6/0055 349/65 |
| 2010/0238367 A1 | 9/2010 | Montgomery et al. |
| 2010/0277664 A1* | 11/2010 | Kim ................ G02B 6/0085 349/58 |
| 2011/0103092 A1 | 5/2011 | Matsui |
| 2013/0170218 A1* | 7/2013 | Wolk ................ G02B 6/0036 362/296.01 |
| 2013/0201428 A1* | 8/2013 | Ohfuku ............. G02B 6/0055 349/65 |

FOREIGN PATENT DOCUMENTS

| | | | |
|---|---|---|---|
| JP | 2001-325820 A | | 11/2001 |
| JP | 2008-218418 A | | 9/2008 |
| JP | 2011-096506 A | | 5/2011 |
| JP | 2012-84303 A | | 4/2012 |
| JP | 2012084303 A | * | 4/2012 |
| JP | 2013-026110 A | | 2/2013 |
| WO | WO2012023484 A1 | | 2/2012 |

* cited by examiner

LIGHT SOURCE DEVICE AND DISPLAY APPARATUS

This application is the national phase under 35 U.S.C. §371 of PCT International Application No. PCT/JP2014/063728 which has an International filing date of May 23, 2014 and designated the United States of America.

1. Technical Field

The present invention relates to a light source device which includes a light guide plate having a notch part formed at an edge part, and a reflection sheet which is disposed to face the light guide plate and has a notch part formed at an edge part corresponding to the notch part of the light guide plate, and a display apparatus including the light source device.

2. Description of Related Art

Recently, display apparatuses such as a liquid crystal television have been widely distributed. Many of such display apparatuses include a light guide plate, and the light guide plate irradiates a display panel which displays an image with light from a light source while propagating the light inside thereof in a plane manner. Meanwhile, it is necessary to prevent a position shift of the light guide plate in order to properly irradiate the display panel with light. In general, the position of the light guide plate is fixed by using a so-called positioning part, and the light guide plate has a notch part formed at a position corresponding to the positioning part.

However, as described above, when fixing the position of the light guide plate by using the positioning part, the light propagating inside the light guide plate, for example, is reflected by a side face relating to the notch part or the positioning part, such that unintended residual reflected light is generated around the notch part to be emitted to the display panel through the light guide plate. Thereby, unevenness in luminance occurs in the display panel.

Furthermore, in order to prevent such unevenness in luminance from being viewed from a user, it is necessary for a frame part covering a peripheral edge part of the display panel to have a prescribed width, and as a result, the area of a display screen seen by the user becomes substantially narrow.

To solve the above problem, Japanese Patent Application Laid-open No. 2012-84303 discloses a light source module in which a positioning part is covered with a covering film which has a reflectance to the light from the light source lower than that of the positioning part itself, thereby preventing an occurrence of unevenness in luminance due to reflection around the notch part of the light guide plate.

SUMMARY

However, in the light source module of Japanese Patent Application Laid-open No. 2012-84303, due to such an effect, an additional process for covering the positioning part with the covering film having a lower reflectance is required, which causes an increase in manufacturing costs.

In general, a side face of the light guide plate is mirror-finished, however a portion of the side face which is the side face of the light guide plate and relates to the notch part formed in the light guide plate is not mirror-finished.

Therefore, when light from the light source is made incident on the light guide plate, irregular reflection occurs on the side face relating to the notch part which is not mirror-finished, and unevenness in luminance between the portion and the other portions occurs. However, it is not possible to cope with such a problem by the light source module of Patent Document 1.

In consideration of the above-mentioned circumstances, it is an object of the present invention to provide a light source device which includes a light guide plate having a notch part formed at an edge part, and a reflection sheet which is disposed to face the light guide plate and has a notch part formed at an edge part corresponding to the notch part of the light guide plate, wherein the reflection sheet includes a low-reflection part which is provided around the notch part of a surface facing the light guide plate and has a reflectance lower than that of the reflection sheet, and thereby it is possible to suppress reflection of residual light which is irregularly reflected on a side face of the light guide plate relating to the notch part, and a display apparatus including the light source device.

According to one aspect of the present invention, there is provided a light source device which includes a light guide plate having a notch part formed at an edge part, and a reflection sheet which is disposed to face the light guide plate and has a notch part formed at an edge part corresponding to the notch part of the light guide plate, wherein the reflection sheet may include a low-reflection part which is provided around the notch part of a surface facing the light guide plate and has a reflectance lower than that of the reflection sheet.

According to the present invention, the reflection sheet includes the low-reflection part which is provided around the notch part of the surface facing the light guide plate and has a reflectance lower than that of the reflection sheet, and reflection of light irregularly reflected on the side face of the light guide plate relating to the notch part is suppressed.

In the light source device according to the present invention, the low-reflection part may have a film having a reflectance lower than that of the reflection sheet.

According to the present invention, the low-reflection part has the film having a reflectance lower than that of the reflection sheet, and reflectance of light irregularly reflected on the side face of the light guide plate relating to the notch part is suppressed by the film.

In the light source device according to the present invention, the film may have portions which are dispersed thereon and have one or a plurality of shapes with a reflectance lower than that of the reflection sheet, and the portions may be configured so as to have a size to be decreased as they are far from the notch part.

According to the present invention, the film has portions which are configured so as to have a size to be decreased as they are far from the notch part, and with being far from the notch part, the effect of suppressing the reflection is gradually decreased. Accordingly, it is possible to prevent unevenness in light (luminance) which may occur by suddenly eliminating the effect of controlling the reflection.

In the light source device according to the present invention, the film may have portions which are dispersed thereon and have one or a plurality of shapes with a reflectance lower than that of the reflection sheet, and the portions may be configured so as to have a density per unit area to be decreased as they are far from the notch part.

According to the present invention, in the low-reflection part, the film has the portions which are configured so as to have a density per unit area to be decreased as they are far from the notch part, and with being far from the notch part, the effect of suppressing the reflection is gradually decreased. Accordingly, it is possible to prevent unevenness in light (luminance) which may occur by suddenly eliminating the effect of controlling the reflection.

The light source device according to the present invention may include: a housing part in which the light guide plate and the reflection sheet are housed; and a positioning part which is provided in the housing part to position the light guide plate and the reflection sheet in the housing part, wherein the film may have a shape similar to the positioning part in a direction in which the light guide plate and the reflection sheet face each other.

According to the present invention, since the film has the shape similar to the positioning part in the direction in which the light guide plate and the reflection sheet face each other, the distance from the positioning part to the film is the same everywhere in the film, such that an function of suppressing the reflection of light which is reflected from the positioning part and again made incident thereon is uniformly executed in the film In the light source device according to the present invention, the reflection sheet may be configured so that a portion other than the low-reflection part contains a fluorescent agent.

According to the present invention, since the portion other than the low-reflection part in the reflection sheet is applied with the fluorescent agent, reflectance of the low-reflection part which is not applied with the fluorescent agent is lower than the other portions. Accordingly, it is possible to achieve an effect of suppressing the reflection of light irregularly reflected on the side face of the light guide plate relating to the notch part.

In the light source device according to the present invention, the fluorescent agent may have constant reflection spectral distribution characteristics.

According to the present invention, since the fluorescent agent has constant reflection spectral distribution characteristics, an occurrence of unnecessary color unevenness on the display is suppressed.

In the light source device according to the present invention, the light guide plate may have a side face which relates to the notch part and is mirror-finished.

According to the present invention, the side face of the light guide plate relating to the notch part is mirror-finished, such that irregular reflection on the notch part is prevented, and an occurrence of unevenness in luminance around the notch part is suppressed.

In the light source device according to the present invention, the light guide plate may include one surface formed in a lens shape to emit light.

According to the present invention, since the one surface of the light guide plate is formed in a lens shape, the straight running stability of light made incident on the light guide plate is increased, and the amount of light emitted through the one surface is increased, while the amount of light going toward the notch part side of the light guide plate is decreased.

In the light source device according to the present invention, the light guide plate may include the other surface formed in a lens shape on the reflection sheet side.

According to the present invention, since the lens shape is formed on the other surface of the light guide plate, the straight running stability of light made incident on the light guide plate is increased, the amount of light emitted through the one surface is increased, while the amount of light going toward the notch part side of the light guide plate is decreased.

In the light source device according to the present invention, the light guide plate may be a rectangular shape, the notch part of the light guide plate may be provided on the edge part of one side face of the light guide plate, and a light source may be disposed on another side face side adjacent to the one side face, and may be located on a center side thereof from the notch part in a direction in which the one side face and the other side face, which is a side face opposite to the one side face, face each other.

According to the present invention, the light source is disposed on the center side of the light guide plate from the notch part in the direction in which the one side face and the other side face face each other, such that a ratio of light going to the notch part among the light made incident on the light guide plate from the light source is decreased.

According to another aspect of the present invention, there is provided a display apparatus including: the light source device as mentioned above; and a display panel which is provided on one surface side of the light guide plate of the light source device, and displays an image using light made incident thereon through the light guide plate.

According to the present invention, the light made incident on the light guide plate from the light source device is propagated in the light guide plate while being totally reflected, such that the light is uniformly emitted from the one surface of the light guide plate, and the display panel displays an image using the light emitted from the light guide plate.

According to the present invention, the reflection sheet includes the low-reflection part which is provided around the notch part of a surface facing the light guide plate and has a reflectance lower than that of the reflection sheet, such that it is possible to suppress an occurrence of luminance unevenness in the display panel due to the light irregularly reflected on the side face of the light guide plate relating to the notch part being reflected by the reflection sheet, and thereby structural research to conceal such luminance unevenness are not required.

The above and further objects and features will move fully be apparent from the following detailed description with accompanying drawings.

DETAILED DESCRIPTION

Hereinafter, a case in which a light source device and a display apparatus according to embodiments of the present invention are applied to a so-called liquid crystal television including a liquid crystal display panel will be described in detail, by way of an example, with reference to the accompanying drawings.

Embodiment 1

Figure 1:
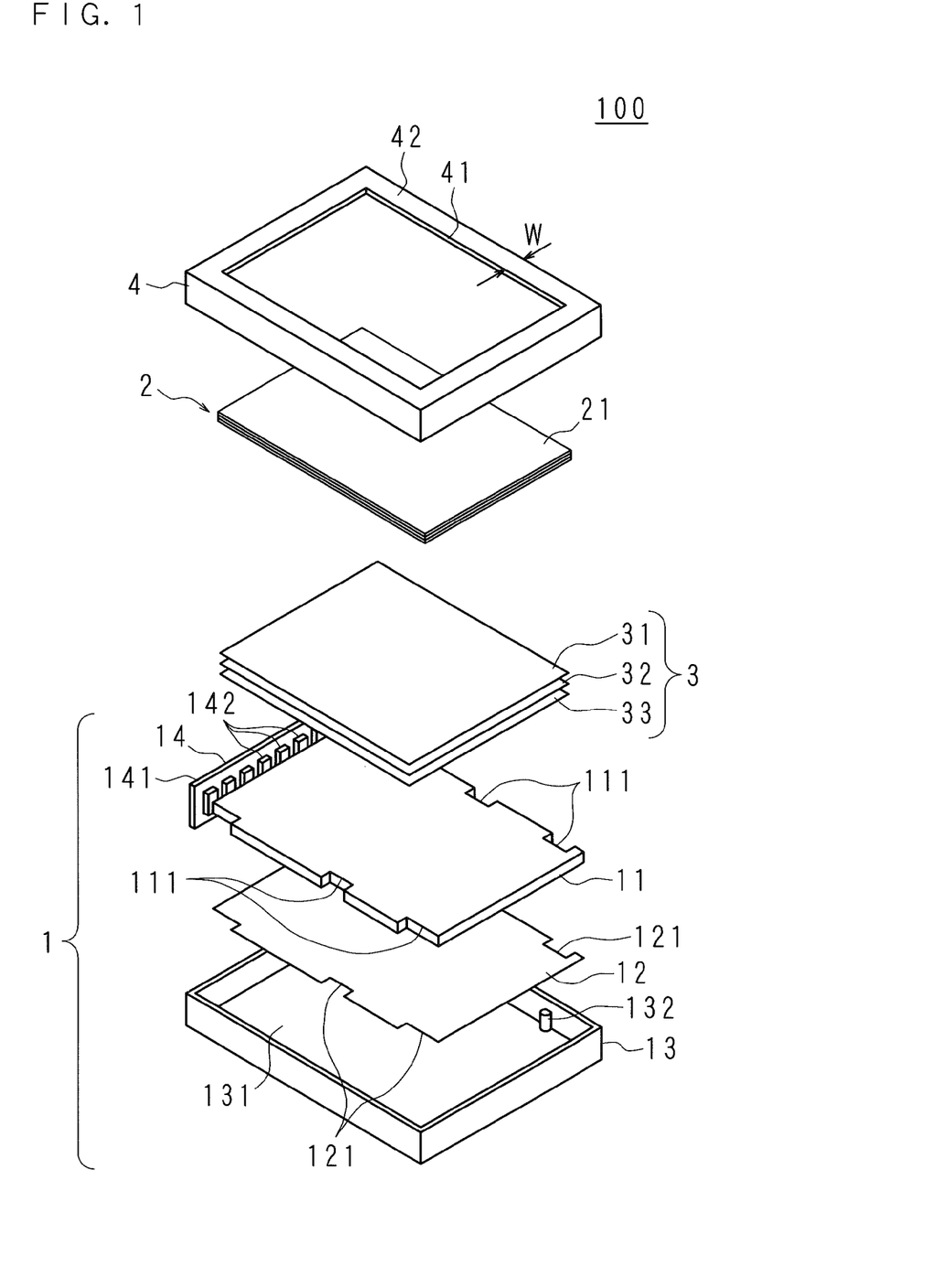
FIG. 1 is an exploded perspective view illustrating a configuration of main components of a liquid crystal television according to Embodiment 1 of the present invention.

FIG. 1 is an exploded perspective view illustrating a configuration of main components of a liquid crystal television according to Embodiment 1 of the present invention. In the figure, a reference numeral 100 represents the liquid crystal television 100. As illustrated in FIG. 1, the liquid crystal television 100 includes a light source device 1, a liquid crystal display panel 2, an optical sheet 3, and a front housing part 4 which house the liquid crystal display panel 2 and the optical sheet 3 and the like.

Further, the light source device 1 includes a light source unit 14, a light guide plate 11 which guides light made incident thereon from the light source unit 14 to one surface of the liquid crystal display panel 2 side, a reflection sheet 12 which reflects the light made incident from the light source unit 14 toward the one surface of the light guide plate 11, and a back housing part 13 which house the light source unit 14, the light guide plate 11 and the reflection sheet 12.

The front housing part 4 is disposed on a front side from the liquid crystal display panel 2 on which an image is displayed. The front housing part 4 is formed in a cylindrical shape having a rectangular bottom copying the shape of one surface 21 of the liquid crystal display panel 2 viewed from a user, and has a rectangular display window 41 opened in the bottom thereof. The user may view the image displayed on the one surface 21 of the liquid crystal display panel 2 through the display window 41.

Portions between edges of the bottom of the front housing part 4 and edges of the display window 41 have a prescribed width W. In other words, in the bottom of the front housing part 4, residual portions other than the display window 41 are formed as hollow rectangular frame parts 42.

Peripheral edge parts of the one surface 21 of the liquid crystal display panel 2 are covered with the frame parts 42, and the optical sheet 3 is provided on the other surface side of the liquid crystal display panel 2, so that one surface of the optical sheet 3 is disposed to face the other surface of the liquid crystal display panel 2.

The liquid crystal display panel 2 is an active matrix type, for example, and includes one transparent substrate of the one surface 21 side and another transparent substrate of the other surface side, which are disposed to face each other at a prescribed gap. Liquid crystal is sealed in the gap between these transparent substrates. A polarizing plate (not illustrated) is provided between the other transparent substrate of the other surface side and the optical sheet 3.

The light guide plate 11 of the light source device 1 is provided on the other surface side of the optical sheet 3, so that the one surface of the light guide plate 11 faces the other surface of the optical sheet 3.

The optical sheet 3 is a publicly known sheet which functions to diffuse and collect, etc. light emitted from the light source unit 14, and then emits the light toward the liquid crystal display panel 2. For example, the optical sheet 3 includes a plurality of laminated diffusion sheets, and specifically, includes a first diffusion sheet 31 disposed on the liquid crystal display panel 2 (polarizing plate) side, a second diffusion sheet 33 disposed on the light guide plate 11 side, and a prism sheet 32 installed between the first diffusion sheet 31 and the second diffusion sheet 33.

The second diffusion sheet 33 is an optical sheet which functions to diffuse light made incident thereon from the light source unit 14 through the light guide plate 11 and allow it to be made incident on the prism sheet 32. In addition, the prism sheet 32 is an optical sheet which functions to collect the light made incident thereon through the second diffusion sheet 33 and emit it toward the liquid crystal display panel 2. The light passing through the prism sheet 32 is made incident on the first diffusion sheet 31 perpendicular to the prism sheet 32. The first diffusion sheet 31 is an optical sheet which functions to again diffuse the light made incident thereon through the prism sheet 32 and emit it toward the liquid crystal display panel 2 with a more uniform luminance distribution.

The light source device 1 is a so-called edge light type, and includes the light source unit 14, the light guide plate 11 disposed on the other surface side of the optical sheet 3, and the reflection sheet 12 provided on the other side light guide plate 11. The reflection sheet 12 is disposed so that one surface thereof faces the other surface of the light guide plate 11, and the light guide plate 11 and the reflection sheet 12 are housed in the back housing part 13 with being laminated to face each other.

The light guide plate 11 is formed of, for example, a high transparency rectangular acrylic resin with a prescribed thickness, and guides the light emitted by light source unit 14 to the optical sheet 3 (liquid crystal display panel 2). For example, the light guide plate 11 may be configured in such a manner that one surface thereof facing the other surface of the optical sheet 3 has an emitting surface on which a pattern is formed so that the light made incident thereon from the light source unit 14 advances in the liquid crystal display panel 2 direction. Thereby, the light guide plate 11 may convert the light made incident thereon from the light source unit 14 into flat light to uniformly transmit it to the optical sheet 3 through the emitting surface. Further, the reflection sheet 12 may be provided on the other surface side of the light guide plate 11.

In addition, the light guide plate 11 has notch parts 111, 111, . . . , and 111 formed on both edge parts of a long side thereof, corresponding to a plurality of positioning parts 132, 132, . . . , and 132 provided in the back housing part 13 to be described below. For example, the notch parts 111, 111, . . . , and 111 are formed at both ends and a center of each long side edge part of the light guide plate 11, and are formed in a U shape in a thickness direction of the light guide plate 11.

Herein, mirror-finishing is executed on each side face of four sides of the light guide plate 11 except a part of the side face relating to the notch part 111, and a part of the light made incident thereon from the light source unit 14 freely passes through the side face to an outside. Meanwhile, the part of the side face relating to the notch part 111 is not executed the mirror finishing, and a part of the light made incident from the light source unit 14 causes irregular reflection on the part of the side face relating to the notch part 111.

Meanwhile, the reflection sheet 12 is formed in a rectangular shape having substantially the same dimensions as the light guide plate 11, and irregularly reflects the light made incident on the light guide plate 11 from the light source unit 14 at the other surface side of the light guide plate 11 to emit it through the emitting surface of the light guide plate 11.

In addition, similarly to the light guide plate 11, the reflection sheet 12 also has notch parts 121, 121, . . . , and 121 formed on an edge part of each long side thereof, corresponding to the positioning parts 132, 132, . . . , and 132 of the back housing part 13. For example, the notch parts 121, 121, . . . , and 121 are formed in a U shape in the thickness direction of the reflection sheet 12.

Further, the light guide plate 11 and the reflection sheet 12 are configured in such a manner that, during being housed in the back housing part 13, the position between the notch parts 111, 111, . . . , and 111 and the notch parts 121, 121, . . . , and 121 match with each other in a direction in which these are laminated (direction in which these face each other, briefly, facing direction).

The light source unit 14 is provided near one side face of a short side of the light guide plate 11. The light source unit 14 has a substrate 141 disposed to face the one side face of the light guide plate 11, and a plurality of light sources 142, 142, . . . , and 142 which are mounted on the substrate 141, and juxtaposed along the one side face of the light guide plate 11. The light source light sources 142, 142, . . . , and 142 may be, for example, a light emitting diode (LED), cold cathode fluorescent lamp (CCFL), hot cathode fluorescent lamp (HCFL), external electrode fluorescent lamp (EEFL) or the like.

The position of the light source unit 14 is not limited to near the one side face of the light guide plate 11, and may be provided near the other side face of the short side, or near the side face of the long side. Further, the light source unit 14 may be configured to be provided at a plurality of places, not only one place.

That is, the light source unit 14 may be configured to be provided near the side faces of both long sides of the light guide plate 11, and may be configured to be provided near the sided faces of both short sides of the light guide plate 11. Further, it is not limited thereto, and the light source unit 14 may be configured so as to be provided near the side faces of four sides of the light guide plate 11, respectively.

The back housing part 13 is formed in a cylindrical shape having a rectangular bottom 131 copying the shape of the reflection sheet 12, and has the positioning parts 132, 132, . . . , and 132 formed at a plurality of places for positioning the light guide plate 11 and the reflection sheet 12 in the back housing part 13 when they are housed therein. Each positioning part 132 is formed in a cylindrical shape whose central axis is parallel to the laminating direction, and is provided on an inner side face of the back housing part 13. The notch parts 111, 111, . . . , and 111 of the light guide plate 11, and the notch parts 121, 121, . . . , and 121 of the reflection sheet 12 are formed so as to correspond to the positioning parts 132, 132, . . . , and 132 of the back housing part 13.

In addition, a bottom 131 of the back housing part 13 is configured so as to have a reflectance lower than that of the reflection sheet 12. The bottom 131 is coated with, for example, a black film entirely or at least on portions corresponding to reflection sheet recesses 122 to be described below.

Additionally, a receiving unit (not illustrated) for receiving television broadcasts is housed in the back housing part 13, and an image relating to the television broadcasts which are received by the receiving unit is displayed on the one surface 21 of the liquid crystal display panel 2.

The light guide plate 11 and the reflection sheet 12 are housed in the back housing part 13 in a state in which these are laminated so that the one surface of the reflection sheet 12 faces the other surface of the light guide plate 11, and the other surface of the reflection sheet 12 and the bottom 131 of the back housing part 13 face each other. In this case, as described above, the light guide plate 11 and the reflection sheet 12 are positioned in the back housing part 13 by the positioning parts 132, 132, . . . , and 132 during being housed therein.

Figure 2:
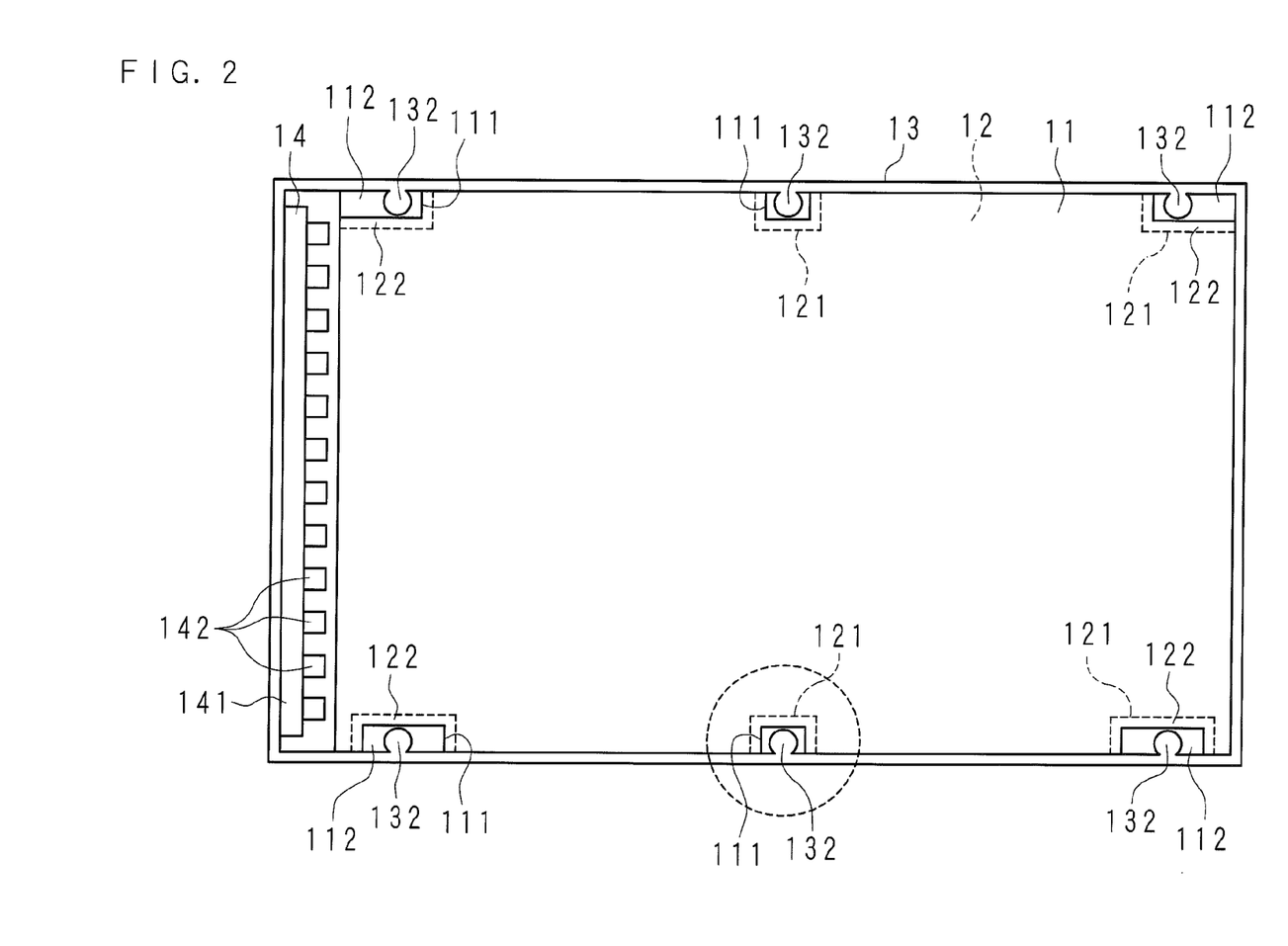
FIG. 2 is a schematic view illustrating a state in which a light guide plate and a reflection sheet are housed in the liquid crystal television according to Embodiment 1 of the present invention as seen in a laminating direction.
Figure 3:
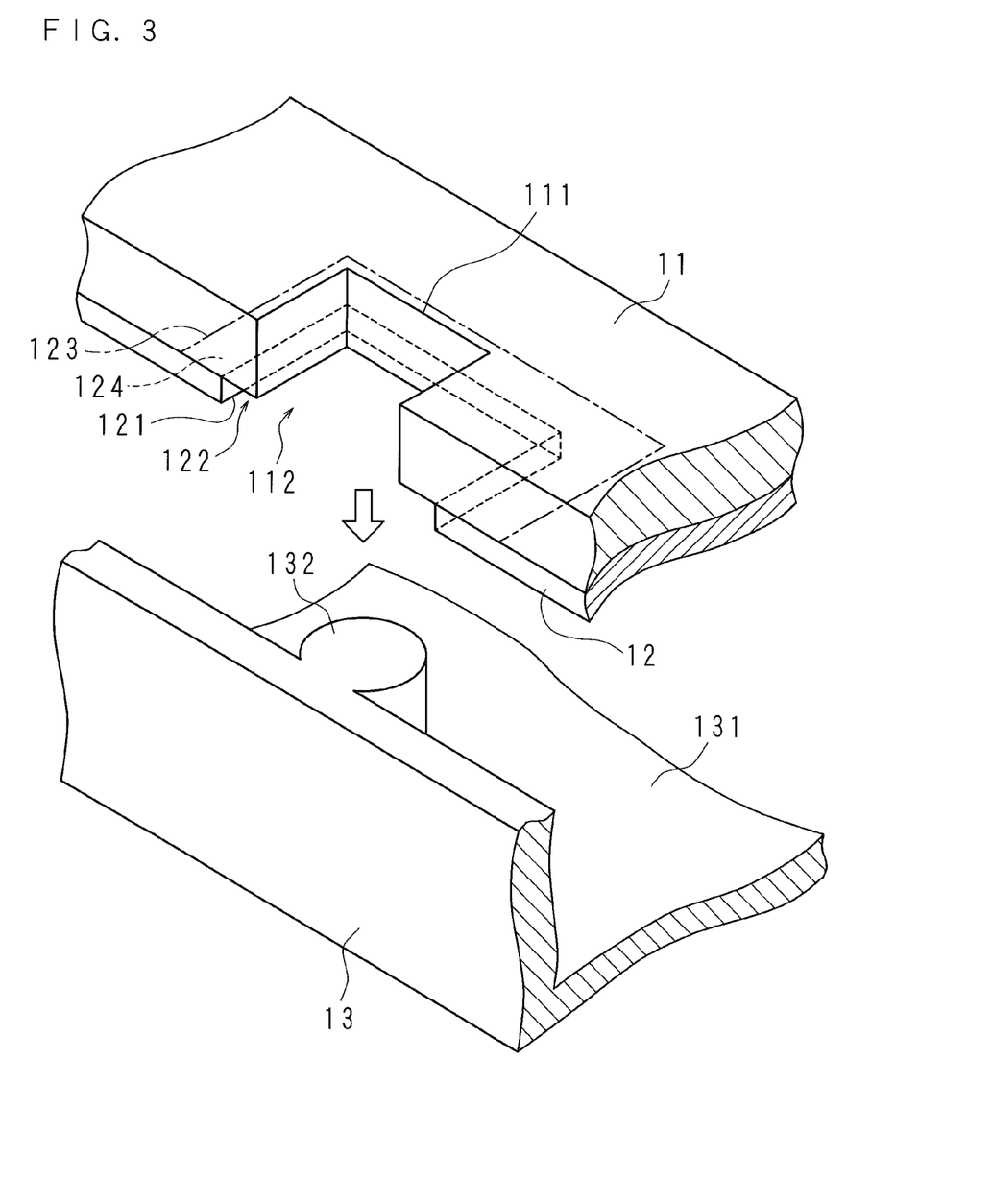
FIG. 3 is a view for describing a positional relationship between the light guide plate, the reflection sheet and a positioning part in the liquid crystal television according to Embodiment 1 of the present invention.
Figure 4:
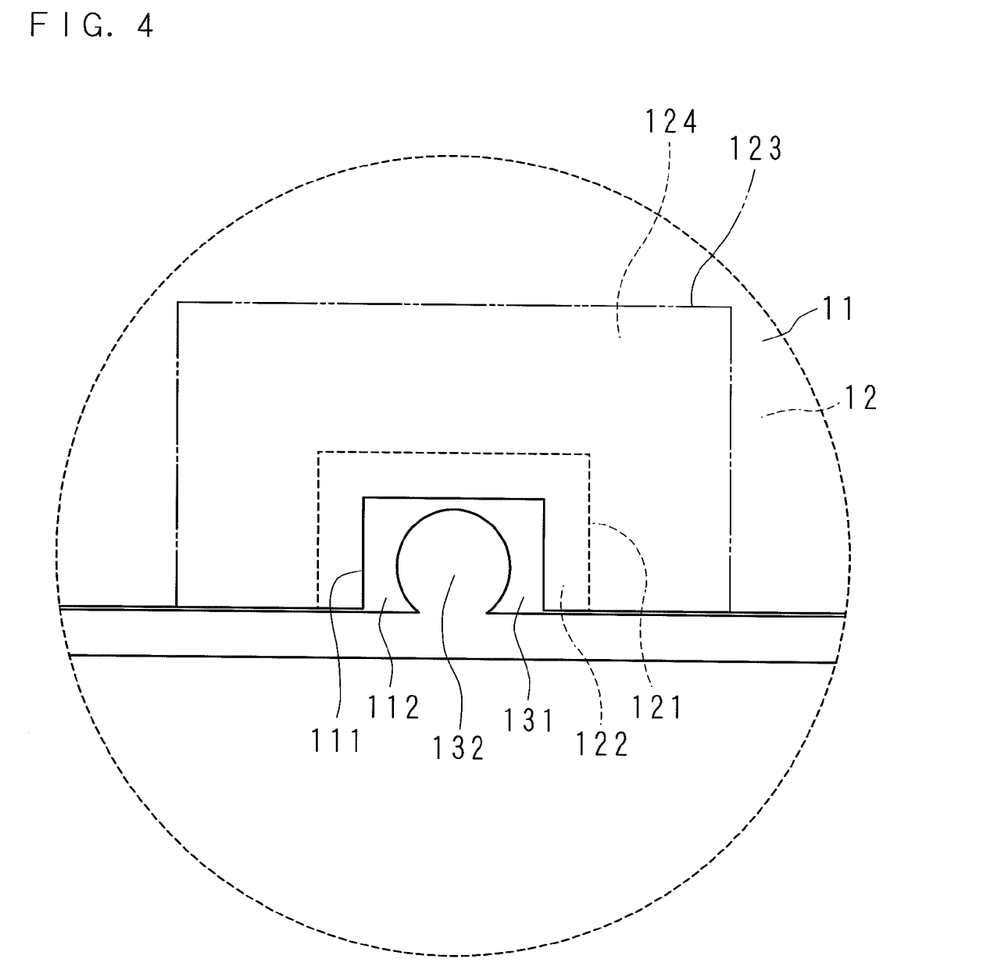
FIG. 4 is an enlarged view of a circle portion in FIG. 2.

FIG. 2 is a schematic view illustrating a state in which the light guide plate 11 and the reflection sheet 12 are housed in the liquid crystal television 100 according to Embodiment 1 of the present invention, FIG. 3 is a view for describing a positional relationship between the light guide plate 11, the reflection sheet 12 and the positioning part 132, and FIG. 4 is an enlarged view of a circle portion in FIG. 2.

The positioning parts 132, 132, . . . , and 132 are positioned within light guide plate recesses 112, 112, . . . , and 112 which are formed due to the notch parts 111, 111, . . . , and 111 being formed in the light guide plate 11, and in the reflection sheet recesses 122, 122, . . . , and 122 which are formed due to the notch parts 121, 121, . . . , and 121 being formed in the reflection sheet 12. Thereby, a position shift of the light guide plate 11 and the reflection sheet 12 is prevented.

As described above, in the direction in which the light guide plate 11 and the reflection sheet 12 are laminated (hereinafter, briefly referred to as the laminating direction), the shape of the notch part 111 is a U shape, and the shape of the notch part 121 is formed in a U shape which is a shape similar to the notch part 111 in the laminating direction. In other words, the shape of the light guide plate recess 112 in the laminating direction is a rectangular shape, and the shape of the reflection sheet recess 122 in the laminating direction is a rectangular shape copying the shape of the light guide plate recess 112.

In addition, the reflection sheet recess 122 is wider than the light guide plate recess 112, and is configured so that the position between the notch part 121 of the reflection sheet 12 and the notch part 111 of the light guide plate 11 match each other in the laminating direction. In the laminating direction, the reflection sheet recess 122 and the light guide plate recess 112 do not have the same area as each other.

That is, as illustrated in FIG. 4, in the laminating direction, the notch part 111 of the light guide plate 11 is configured so as to be located inside of the notch part 121 of the reflection sheet 12, and the notch part 111 of the light guide plate 11 is included in the notch part 121. In order words, in the laminating direction, the light guide plate recess 112 is located inside of the reflection sheet recess 122, and the bottom 131 of the back housing part 13 is exposed through the light guide plate recess 112 and the reflection sheet recess 122.

Further, the one surface of the reflection sheet 12 facing the other surface of the light guide plate 11 is provided with a low-reflection part 123 having a reflectance lower than that of the reflection sheet 12. The low-reflection part 123 is provided along the edge of the notch part 121. In other words, the low-reflection part 123 is provided so as to surround the positioning part 132 corresponding thereto.

The low-reflection part 123 is a region having a prescribed width in a vertical direction with respect to the edge of the notch part 121 around the notch part 121. The low-reflection part 123 has a low-reflection film 124 having a reflectance lower than that of the reflection sheet 12. The low-reflection film 124 is made of, for example, a black material such as titanium oxide, silicon dioxide, carbon or the like, and is coated so as to cover the region relating to the low-reflection part 123 in the one surface of the reflection sheet 12.

Since the liquid crystal television 100 according to Embodiment 1 of the present invention has the above-described configuration, as described above, it is possible to solve the problem that unevenness in light occurs near the notch part 111, or the problem that the display window 41 becomes narrow due to the necessity of widening the width W in the frame part 42 to conceal such unevenness in light, which will be described below.

Incident light made incident on the light guide plate 11 from the light source unit 14 is reflected by the reflection sheet 12 toward the emitting surface of the light guide plate 11, however, a part of the incident light passes through the side face of the light guide plate 11 to the outside. The light passing through the part of the side face relating to the notch part 111 which is not executed the mirror-finishing among such a part of the incident light causes irregular reflection on the part of the side face. That is, the part of the side face relating to the notch part 111 of the light guide plate 11 causes the irregular reflection of the incident light, while a portion along the side face relating to the notch part 111 exhibits a residual shine compared to the other portions of the light guide plate 11, and thereby unevenness in luminance occurs.

Further, a part of the incident light passing through the part of the side face relating to the notch part 111 to the outside is reflected by the positioning part 132 and again made incident on the part of the side face relating to the notch part 111 to shine more brightly. In this case, when a distance from the positioning part 132 to the part of the side face relating to the notch part 111 is partially different from each other, an amount of light again made incident becomes partially different in the part of the side face relating to the notch part 111, and thereby increasing the unevenness in luminance at the portion along the side face relating to the notch part 111 of the light guide plate 11.

In addition, when such unevenness in luminance at the portion along the side face relating to the notch part 111 is reflected by the reflection sheet 12 to the liquid crystal display panel 2, the unevenness in luminance also occurs in the one surface 21 of the liquid crystal display panel 2, and thereby provides an abnormal feeling to a user. Accordingly, in order to conceal such unevenness in luminance, it is necessary to widen the width W in the frame part 42.

Compared with this, the liquid crystal television 100 according to the present invention is configured in such a manner that, as described above, the notch part 111 of the light guide plate 11 is included inside of the notch part 121 of the reflection sheet 12 in the laminating direction, such that the reflection sheet 12 is not present near the notch part 111 of the other surface side in the light guide plate 11. Accordingly, unevenness due to the irregular reflection generated at the portion along the side face of the notch part 111 is not reflected to the liquid crystal display panel 2. In addition, unevenness due to the light, in which the incident light passing through the part of the side face of the notch part 111 to the outside is reflected by the positioning part 132 and is again made incident on the part of the side face of the notch part 111, is not also reflected to the liquid crystal display panel 2. In addition, the above-described function is executed at the portion along the side face of the notch part 111 at the same level, because the shape of the notch part 121 in the laminating direction is a shape similar to the notch part 111.

Further, a part of the light irregularly reflected by the portion along the side face of the notch part 111 is absorbed by the bottom 131 of the back housing part 13 which is exposed through the light guide plate recess 112 and the reflection sheet recess 122, such that the amount of irregularly reflected light is decreased.

Furthermore, in the liquid crystal television 100 according to the present invention, as described above, the low-reflection part 123 having a reflectance lower than that of the reflection sheet 12 is provided around the notch part 121. Therefore, the reflection of the light which is irregularly reflected by the portion along the side face of the notch part 111 is further suppressed by the low-reflection part 123 (low-reflection film 124).

From the above description, in the liquid crystal television 100 according to the present invention, unevenness in luminance does not occur at the one surface 21 of the liquid crystal display panel 2, and it is possible to prevent providing an abnormal feeling to the user, and maintain display quality of a screen, as well as narrow the width W in the frame part 42, and provide a wider image display range to the user.

Embodiment 2

Figure 5:
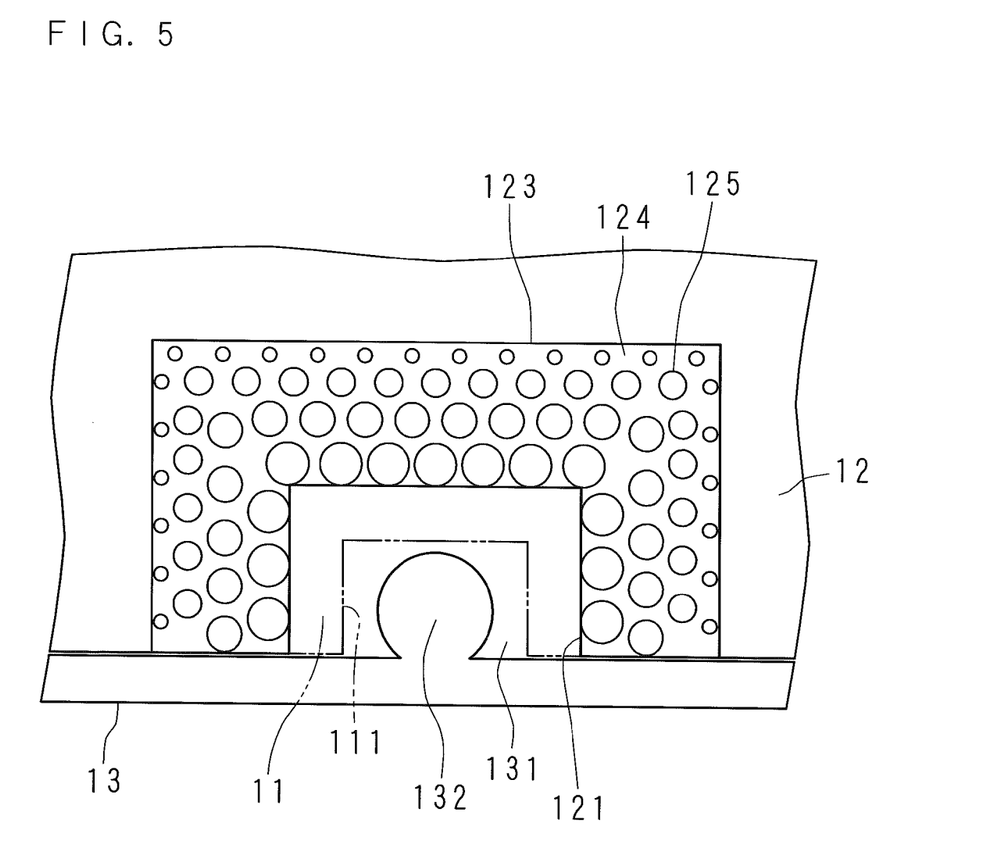
FIG. 5 is a view for describing a low-reflection part of the reflection sheet in a liquid crystal television according to Embodiment 2 of the present invention.

A liquid crystal television 100 according to Embodiment 2 of the present invention has the same configuration as the Embodiment 1, but the configuration of a low-reflection part 123 is different therefrom. FIG. 5 is a view for describing the low-reflection part 123 of the reflection sheet 12 in the liquid crystal television 100 according to Embodiment 2 of the present invention. FIG. 5 illustrates the case in which the light guide plate 11 is eliminated in the laminating direction, and for the convenience of explanation, in order to compare with the light guide plate 11, the light guide plate 11 is shown by a broken line.

The one surface of the reflection sheet 12 facing the other surface of the light guide plate 11 is provided with the low-reflection part 123 having a reflectance lower than that of the reflection sheet 12. The low-reflection part 123 is provided along the edge of the notch part 121, and is provided so as to surround the positioning part 132 corresponding thereto.

The low-reflection part 123 is a region having a prescribed width in the vertical direction with respect to the edge of the notch part 121 around the notch part 121. The low-reflection part 123 has a low-reflection film 124 having a reflectance lower than that of the reflection sheet 12.

The low-reflection film 124 has portions 125 having a reflectance lower than that of the reflection sheet 12 at a plurality of places. As illustrated in FIG. 5, the portions 125 are formed in a circular shape, and are dispersed over the entire range of the low-reflection part 123. The portion 125 is coated so as to cover the region relating to the low-reflection part 123 in the one surface of the reflection sheet 12, by using, for example, a black material such as titanium oxide, silicon dioxide, carbon or the like.

Further, the low-reflection part 123 is configured in such a manner that the size of the portion 125 is decreased, as they are away from the edge of the notch part 121. That is, the low-reflection part 123 is configured in such a manner that the density of the portions 125 per unit area is decreased in the region relating to the low-reflection part 123, as they are away from the edge of the notch part 121.

Thereby, in the liquid crystal television 100 according to Embodiment 2 of the present invention, it is possible to achieve a canceling effect in which the unevenness in the residual light near the notch part 111 and "dark-part" unevenness due to the low-reflection film 124 (portion 125) cancel each other.

Further, when the "dark-part" unevenness is increased too much, the display quality of a screen is decreased due to the "dark-part" unevenness, and therefore, the level of the "dark-part" unevenness is controlled by a circular diameter and density of the portion 125.

In addition, the shape of the portion 125 is not limited to the circular shape, but may be other shapes. Further, the portion 125 may be configured in such a manner that not only one shape but also a plurality of shapes thereof coexist.

Since the liquid crystal television 100 according to Embodiment 2 of the present invention has the above-described configuration, as described above, it is possible to solve the problem that unevenness in light occurs near the notch part 111, or the problem that the display window 41 becomes narrow due to the necessity of widening the width W in the frame part 42 to conceal such unevenness in light.

That is, the liquid crystal television 100 according to Embodiment 2 of the present invention is configured in such a manner that, as described above, the notch part 111 of the light guide plate 11 is included inside of the notch part 121 of the reflection sheet 12 in the laminating direction, such that the reflection sheet 12 is not present near the notch part 111 of the other surface side of the light guide plate 11. Accordingly, unevenness due to the irregular reflection generated at the portion along the side face of the notch part 111 is not reflected to the liquid crystal display panel 2. In addition, unevenness due to the light, in which the incident light passing through the part of the side face of the notch part 111 to the outside is reflected by the positioning part 132 and again made incident on the part of the side face of the notch part 111, is not also reflected to the liquid crystal display panel 2.

Further, a part of the light irregularly reflected by the portion along the side face of the notch part 111 is absorbed by the bottom 131 of the back housing part 13 which is exposed through the light guide plate recess 112 and the reflection sheet recess 122, such that the amount of irregularly reflected light is decreased.

In addition, in the liquid crystal television 100 according to the present invention, the low-reflection part 123 having a reflectance lower than that of the reflection sheet 12 is provided around the notch part 121. Therefore, the reflection of the light which is irregularly reflected by the portion along the side face of the notch part 111 is further suppressed by the low-reflection part 123 (low-reflection film 124).

From the above description, in the liquid crystal television 100 according to Embodiment 2 of the present invention, unevenness in luminance does not occur at the one surface 21 of the liquid crystal display panel 2, and it is possible to prevent providing an abnormal feeling to the user, and maintain display quality of a screen, as well as narrow the width W in the frame part 42, and provide a wider image display range to the user.

The same parts as those in Embodiment 1 will be denoted by the same reference numerals, and will not be described.

Embodiment 3

Figure 6:
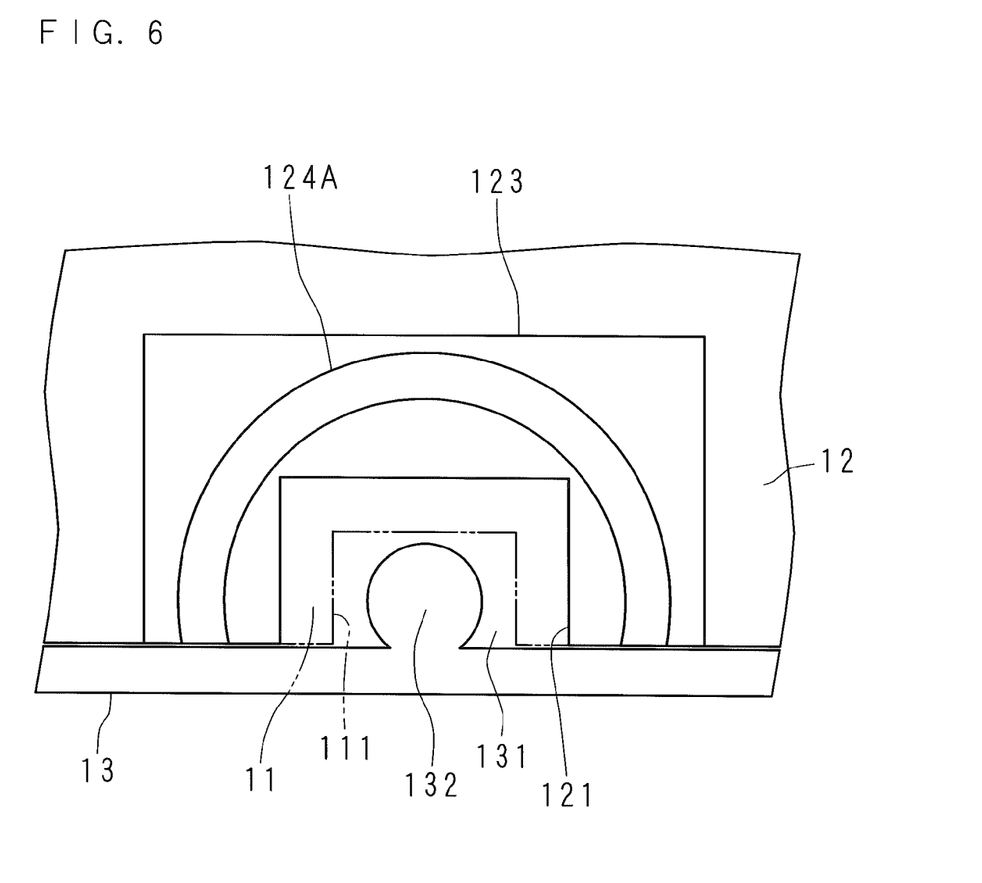
FIG. 6 is a view for describing a low-reflection part of a reflection sheet in a liquid crystal television according to Embodiment 3 of the present invention.

A liquid crystal television 100 according to Embodiment 3 of the present invention has the same configuration as that of Embodiment 1, but the configuration of a low-reflection part 123 is different therefrom. FIG. 6 is a view for describing the low-reflection part 123 of the reflection sheet 12 in the liquid crystal television 100 according to Embodiment 3 of the present invention. FIG. 6 illustrates the case in which the light guide plate 11 is eliminated in the laminating direction, and for the convenience of explanation, in order to compare with the light guide plate 11, the light guide plate 11 is shown by a broken line.

The one surface of the reflection sheet 12 facing the other surface of the light guide plate 11 is provided with the low-reflection part 123 having a reflectance lower than that of the reflection sheet 12. The low-reflection part 123 is provided along the edge of the notch part 121, and is provided so as to surround the positioning part 132 corresponding thereto.

The low-reflection part 123 is a region having a prescribed width in the vertical direction with respect to the edge of the notch part 121 around the notch part 121. In addition, the low-reflection part 123 has a low-reflection film 124A having a reflectance lower than that of the reflection sheet 12.

The low-reflection film 124A has a reflectance lower than that of the reflection sheet 12, and is made of, for example, a black material such as titanium oxide, silicon dioxide, carbon or the like. The low-reflection film 124A is coated so as to surround the positioning part 132 corresponding thereto within the region relating to the low-reflection part 123 in the one surface of the reflection sheet 12.

In addition, the low-reflection film 124A has a shape copying the positioning part 132 corresponding thereto in the laminating direction (facing direction). That is, as illustrated in FIG. 6, in Embodiment 3, the shape of the positioning part 132 is a circular shape in the laminating direction, and the low-reflection film 124A has an arc shape copying the circular shape of the positioning part 132.

Since the liquid crystal television 100 according to Embodiment 3 of the present invention has the above-described configuration, as described above, it is possible to solve the problem that unevenness in light occurs near the notch part 111, or the problem that the display window 41 becomes narrow due to the necessity of widening the width W in the frame part 42 to conceal such unevenness in light.

That is, the liquid crystal television 100 according to Embodiment 3 of the present invention is configured in such a manner that, as described above, the notch part 111 of the light guide plate 11 is included inside of the notch part 121 of the reflection sheet 12 in the laminating direction, such that the reflection sheet 12 is not present near the notch part 111 of the other surface side of the light guide plate 11. Accordingly, even when irregular reflection occurs at the portion along the side face of the notch part 111, such residual light is not reflected to the liquid crystal display panel 2.

In addition, as described above, the low-reflection film 124A has a shape copying the positioning part 132 in the laminating direction (facing direction). That is, the distance from the positioning part 132 to the low-reflection film 124A is the same everywhere in the low-reflection film 124A, such that an function of suppressing the reflection of light which is reflected from the positioning part 132 and again made incident on the portion along the side face of the notch part 111 is uniformly executed in the low-reflection film 124A. Accordingly, it is possible to prevent an amplification of the unevenness in light caused by non-uniform in an effect of suppressing the reflection of re-incident light with each part of the low-reflection film 124A.

Further, a part of the light irregularly reflected by the portion along the side face of the notch part 111 is absorbed by the bottom 131 of the back housing part 13 which is exposed through the light guide plate recess 112 and the reflection sheet recess 122, such that the amount of irregularly reflected light is decreased.

From the above description, in the liquid crystal television 100 according to the present invention, unevenness in luminance does not occur at the one surface 21 of the liquid crystal display panel 2, and it is possible to prevent providing an abnormal feeling to the user, and maintain display quality of a screen, as well as narrow the width W in the frame part 42, and provide a wider image display range to the user.

The same parts as those in Embodiment 1 will be denoted by the same reference numerals, and will not be described.

Embodiment 4

Figure 7:
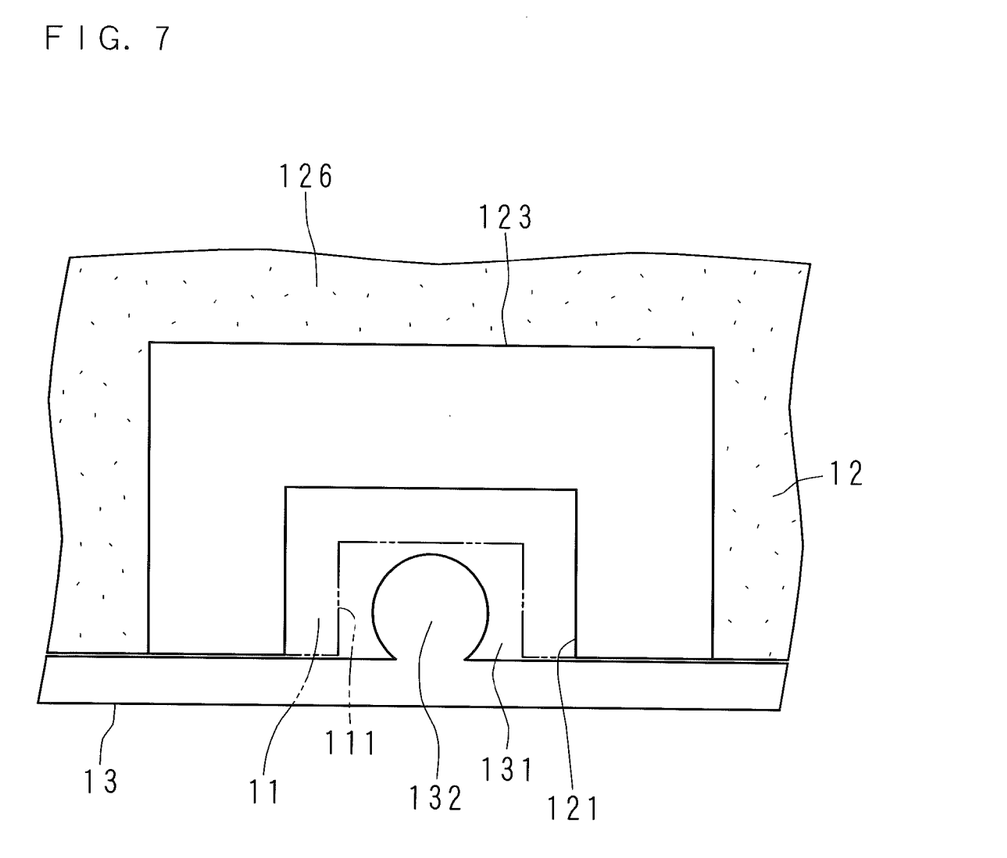
FIG. 7 is a view for describing a low-reflection part of a reflection sheet in a liquid crystal television according to Embodiment 4 of the present invention.

A liquid crystal television 100 according to Embodiment 4 of the present invention has the same configuration as the Embodiment 1, but the configuration of a low-reflection part 123 is different therefrom. FIG. 7 is a view for describing the low-reflection part 123 of the reflection sheet 12 in the liquid crystal television 100 according to Embodiment 4 of the present invention. FIG. 7 illustrates the case in which the light guide plate 11 is eliminated in the laminating direction, and for the convenience of explanation, in order to compare with the light guide plate 11, the light guide plate 11 is shown by a broken line.

The one surface of the reflection sheet 12 facing the other surface of the light guide plate 11 is provided with the low-reflection part 123 having a reflectance lower than that of the reflection sheet 12. The low-reflection part 123 is provided along the edge of the notch part 121, and is provided so as to surround the positioning part 132 corresponding thereto.

The low-reflection part 123 is a region having a prescribed width in the vertical direction with respect to the edge of the notch part 121 around the notch part 121. The low-reflection part 123 has a reflectance lower than that of the reflection sheet 12.

In more detail, a portion other than the low-reflection part 123 in the reflection sheet 12 contains a fluorescent agent. For example, the portion other than the low-reflection part 123 in the reflection sheet 12 is applied with a fluorescent whitening agent 126. That is, since the low-reflection part 123 is not applied with the fluorescent whitening agent 126, reflectance of the low-reflection part 123 is decreased compared to the other portion applied with the fluorescent whitening agent 126 in the reflection sheet 12.

In other words, in the portion other than the low-reflection part 123 in the reflection sheet 12, aside from the reflection of the incident light which is made incident from the light source unit 14, light is emitted from the fluorescent whitening agent 126 excited by the incident light, and the light emits through the one surface of the light guide plate 11. Meanwhile, in the low-reflection part 123 which is not applied with the fluorescent whitening agent 126, the above-described emission of light from the fluorescent whitening agent 126 does not occur.

Accordingly, even if the residual light generated near the notch part 111 is reflected by the low-reflection part 123 to the liquid crystal display panel 2 side, in the liquid crystal display panel 2, the unevenness is mitigated by the light reflected by the portion other than the low-reflection part 123 and the emitted light. Therefore, it is difficult for the user to observe the unevenness in luminance.

In the present embodiment, the portion other than the low-reflection part 123 of the reflection sheet 12 is coated with the fluorescent whitening agent 126, but the present invention is not limited thereto. For example, the fluorescent whitening agent may be mixed into the reflection sheet 12 by post-processing such as impregnation, diffusion, or the like, and may be mixed in the reflection sheet 12 during manufacturing the reflection sheet 12.

Since the liquid crystal television 100 according to Embodiment 4 of the present invention has the above-described configuration, as described above, it is possible to solve the problem that unevenness in light occurs near the notch part 111, or the problem that the display window 41 becomes narrow due to the necessity of widening the width W in the frame part 42 to conceal such unevenness in light.

That is, the liquid crystal television 100 according to Embodiment 4 of the present invention is configured in such a manner that, as described above, the notch part 111 of the light guide plate 11 is included inside of the notch part 121 of the reflection sheet 12 in the laminating direction. Therefore, even when irregular reflection occurs at the portion along the side face of the notch part 111, such residual light is not reflected to the liquid crystal display panel 2.

Further, a part of the light irregularly reflected by the portion along the side face of the notch part 111 is absorbed by the bottom 131 of the back housing part 13 which is exposed through the light guide plate recess 112 and the reflection sheet recess 122, such that the amount of irregularly reflected light is decreased.

Further, in the reflection sheet 12, since the fluorescent agent is contained in only the portions other than the low-reflection part 123, as described above, even if the residual light generated near the notch part 111 is reflected by the low-reflection part 123 to the liquid crystal display panel 2 side, in the liquid crystal display panel 2, the unevenness is mitigated by the light reflected by the portion other than the low-reflection part 123 and the emitted light. Therefore, it is difficult for the user to observe the unevenness in luminance.

From the above description, in the liquid crystal television 100 according to the present invention, unevenness in luminance does not occur at the one surface 21 of the liquid crystal display panel 2, and it is possible to prevent providing an abnormal feeling to the user, and maintain display quality of a screen, as well as narrow the width W in the frame part 42, and provide a wider image display range to the user.

The same parts as those in Embodiment 1 will be denoted by the same reference numerals, and will not be described.

In addition, the present invention is not limited to the above description. The light guide plate 11 may be configured to execute the mirror-finishing on the part of the side face relating to the notch part 111 thereof. Thereby, it is possible to prevent the irregular reflection on the part of the side face relating to the notch part 111. In this case, the unevenness in luminance generated around the notch part 111 is caused by only the light which is emitted through the part of the side face relating to the notch part 111 to the outside and reflected by the positioning part 132, and then again made incident on the light guide plate 11, and it is possible to decrease the amount of light causing such unevenness in luminance. Therefore, it is possible to suppress an occurrence of the unevenness in luminance near the notch part 111.

The fluorescent agent may have constant reflection spectral distribution characteristics. Thereby, the light reflected by the fluorescent agent may suppress an occurrence of color unevenness caused by the repeated reflection of light having unnecessary colors such as blue, red or the like.

Figure 8:
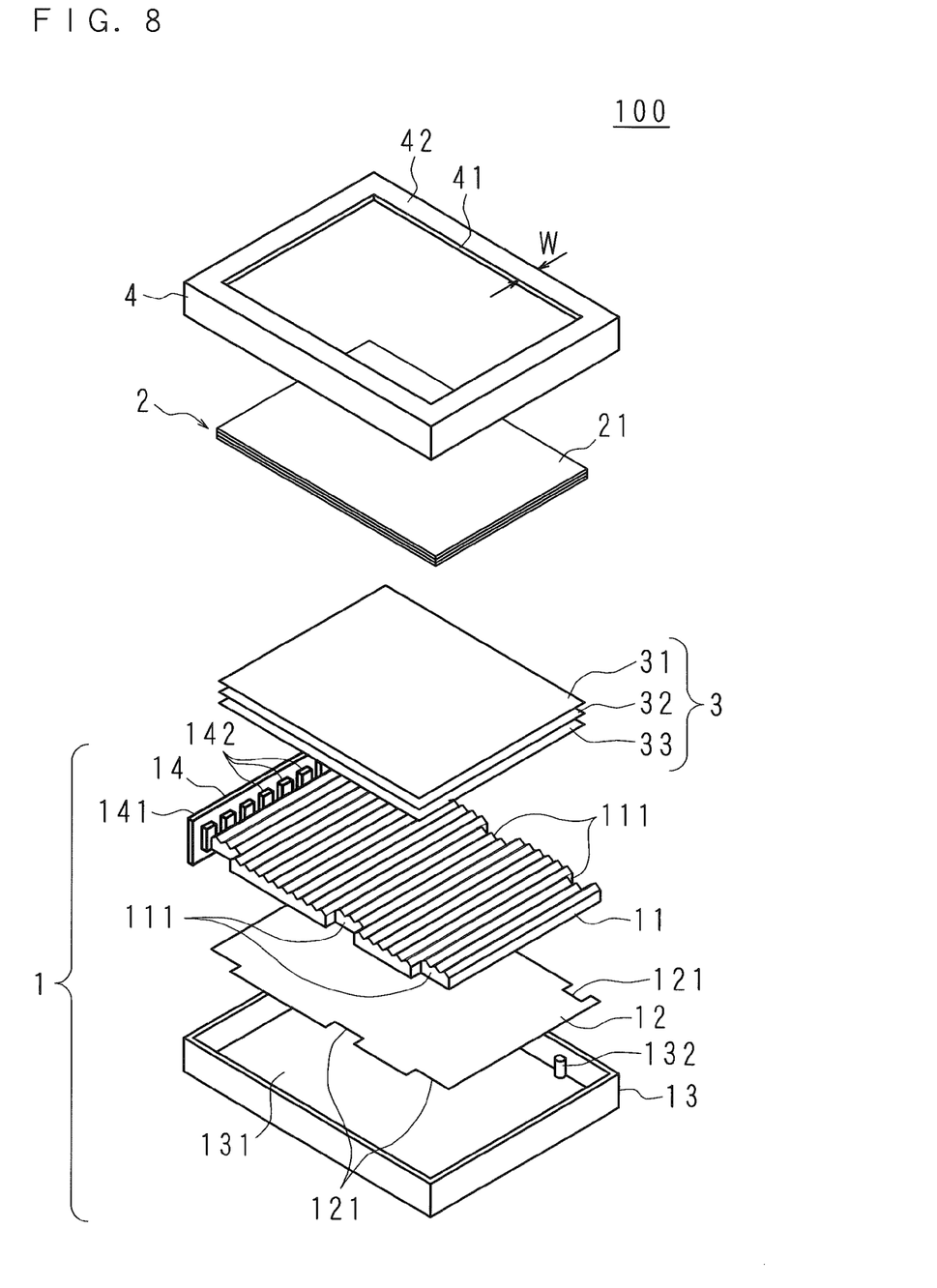
FIG. 8 is a view for illustrating a state in which one surface of the light guide plate has the lens shape, according to embodiments of the present invention.

In addition, the present invention is not limited to the above description. The one surface of the light guide plate 11 may be formed in a lens shape. Thereby, since the straight running stability of light made incident from the light sources 142, 142, . . . , and 142 to the light guide plate 11 is increased, the amount of light emitted through the one surface of the light guide plate 11 is increased, while the amount of light going toward the notch part 111 side of the light guide plate 11 is decreased. Therefore, it is possible to decrease an occurrence of the unevenness in luminance around the notch part 111. FIG. 8 is a view for illustrating a state in which one surface of the light guide plate has the lens shape.

Figure 9:
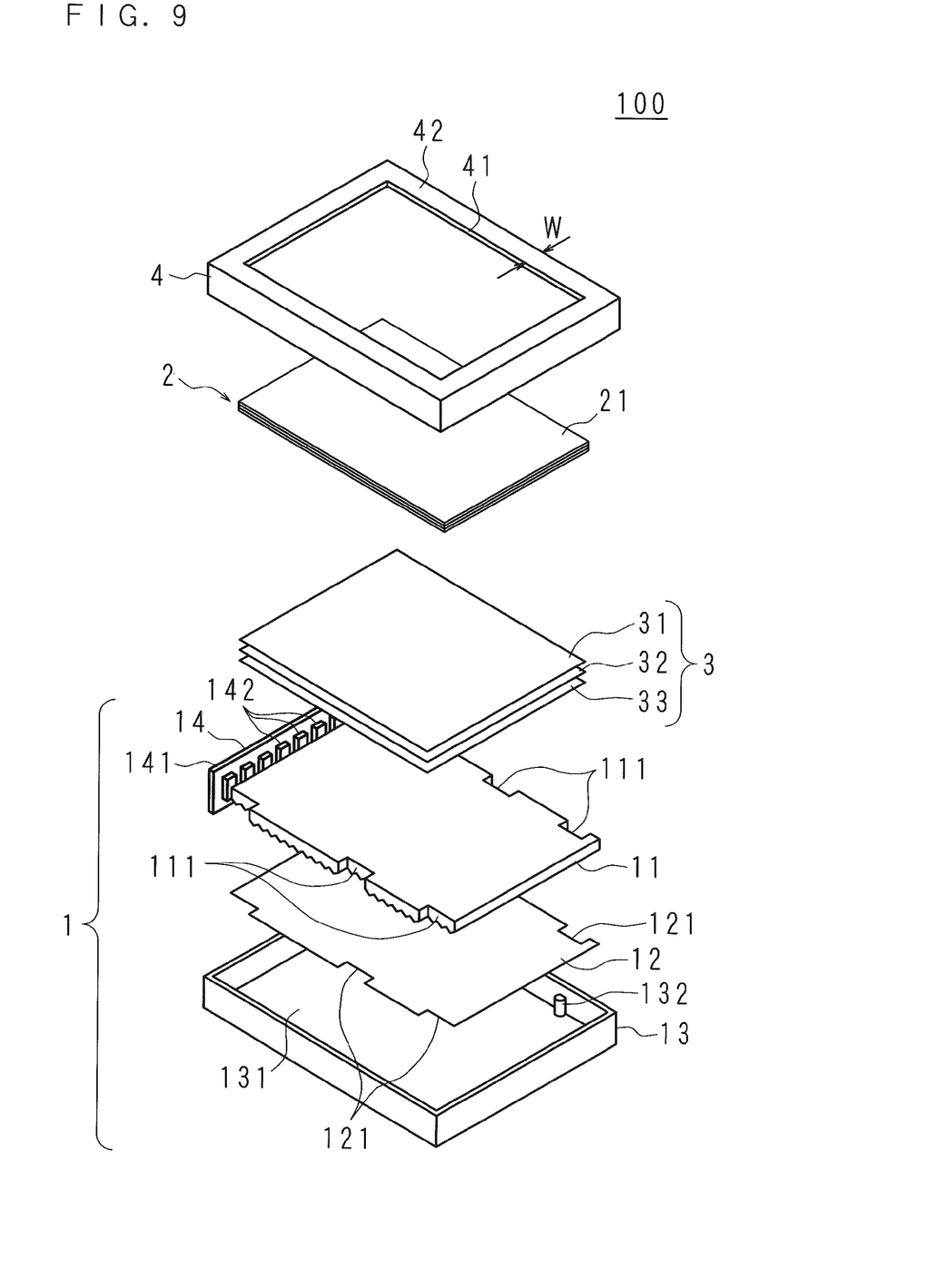
FIG. 9 is a view for illustrating a state in which the other surface of the light guide plate has the lens shape, according to embodiments of the present invention.

Further, the present invention is not limited to the above description. The other surface of the light guide plate 11 may be formed in a lens shape. Thereby, since the straight running stability of light made incident from the light sources 142, 142, . . . , and 142 to the light guide plate 11 is increased, the amount of light emitted through the one surface of the light guide plate 11 is increased, while the amount of light going toward the notch part 111 side of the light guide plate 11 is decreased. Therefore, it is possible to decrease the occurrence of the unevenness in luminance around the notch part 111. FIG. 9 is a view for illustrating a state in which the other surface of the light guide plate has the lens shape.

Further, the present invention is not limited to the above description. For example, the light sources 142, 142, . . . , and 142 provided on the short side of the light guide plate 11 may be configured so as to be located on the center side of the light guide plate 11 from the notch parts 111, 111, . . . , and 111 formed on both long sides of the light guide plate 11, in other words, on the center side of the light guide plate 11 in a direction in which the both long sides of the light guide plate 11 face with each other, that is, in the lateral direction of the light guide plate 11. Thereby, it is possible to decrease a ratio of light going to the notch parts 111, 111, . . . , and 111 among the light made incident on the light guide plate 11 from the light sources 142, 142, . . . , and 142, and decrease the occurrence of the unevenness in luminance around the notch parts 111, 111, . . . , and 111.

The invention claimed is:

1. A light source device including
a light guide plate having a notch part formed at an edge part, and a reflection sheet which is disposed to face the light guide plate and has a notch part formed at an edge part corresponding to the notch part of the light guide plate,
wherein the reflection sheet comprises a low-reflection part which is provided along an edge of the notch part on a surface facing the light guide plate and has a reflectance lower than that of the rest of the reflection sheet, the notch part of the light guide plate forms a light guide plate recess and the notch part of the reflection sheet forms a reflection sheet recess, the light guide recess does not have the same area as the reflection sheet recess, and the light guide plate recess is located inside of the reflection sheet recess such that a surface of the light guide plate facing the reflection sheet is exposed through the reflection sheet recess.

2. The light source device according to claim 1, wherein the light guide plate has a mirror-finished side face near the notch part of the light guide plate.

3. The light source device according to claim 1, wherein the light guide plate includes one surface formed in a lens shape to emit light.

4. The light source device according to claim 1, wherein the light guide plate includes a surface formed in a lens shape on the reflection sheet side.

5. The light source device according to claim 1, wherein the light guide plate is a rectangular shape,
a plurality of the notch parts of the light guide plate are provided on both edges opposed to each other of the light guide plate, and
a light source is disposed near another edge other than the both edges of the light guide plate along the another edge such that an end part of the light source is not to overlap the notch parts of the light guide plate in a direction parallel to the both edges.

6. A display apparatus comprising:
the light source device according to claim 1; and
a display panel which is provided on one surface side of the light guide plate of the light source device, and displays an image using light made incident thereon through the light guide plate.

7. The light source device according to claim 1, wherein the low-reflection part has a film having a reflectance lower than that of the rest of the reflection sheet.

8. The light source device according to claim 7, wherein the film has portions which are dispersed on the film and have one or a plurality of shapes with a reflectance lower than that of the reflection sheet, and
the portions are configured so as to have a size to be decreased as they are positioned further from the notch part.

9. The light source device according to claim 7, wherein the film has portions which are dispersed on the film and have one or a plurality of shapes with a reflectance lower than that of the reflection sheet, and
the portions are configured so as to have a density per unit area to be decreased as they are positioned further from the notch part.

10. The light source device according to claim 7, further comprising:
a housing part in which the light guide plate and the reflection sheet are housed; and
a positioning part which is provided in the housing part to position the light guide plate and the reflection sheet in the housing part,
wherein the film has a shape similar to the positioning part in a direction in which the light guide plate and the reflection sheet face each other.

11. The light source device according to claim 1, wherein the reflection sheet is configured so that a portion other than the low-reflection part contains a fluorescent agent.

12. The light source device according to claim 11, wherein the fluorescent agent has constant reflection spectral distribution characteristics.

* * * * *